Oct. 16, 1962  H. C. HARBERS ETAL  3,058,740
LEAF-SPRING-SECURING ASSEMBLY FOR VEHICLE AXLES
Filed May 5, 1959

Henry C. Harbers,
Harrison J. Williams,
INVENTORS.

BY
Attorney

United States Patent Office 3,058,740
Patented Oct. 16, 1962

3,058,740
LEAF-SPRING-SECURING ASSEMBLY FOR VEHICLE AXLES
Henry C. Harbers, Pasadena, and Harrison J. Williams, South San Gabriel, Calif., assignors to Western Unit Corporation, Los Angeles, Calif., a corporation of California
Filed May 5, 1959, Ser. No. 811,156
3 Claims. (Cl. 267—52)

Our invention relates to single-axle spring suspensions for wheeled vehicles, and more particularly to the assembly employed to secure the medial portion of a leaf spring to a vehicle axle.

Spring-securing assemblies as heretofore designed are made up of parts which require separate application to and the careful adjustment thereof on both the spring and the axle in order that the spring be fixedly secured on the axle against turning or other movement so as to maintain the axle in line.

It is a purpose of our invention to provide in a single-axle suspension, a spring-securing assembly having parts so constructed that, at the factory, they can be assembled and adjusted on a spring of a particular size, to produce a unitary structure which can as such be sold for use on a particular size and shape axle of a certain size vehicle, thus eliminating the necessity of any adjustment of the parts of the assembly in relation to the axle and the spring in order to fixedly secure the spring in proper position on the axle.

It is also a purpose of our invention to provide a spring-securing assembly as above characterized, and wherein the individual parts thereof are of simple construction and readily applied to and adjusted on a leaf spring to so secure the assembly to the leaf spring that when it comes to mounting the spring on a circular or non-circular axle it can be accomplished through the simple expedient of welding certain parts of the assembly to the axle.

We will describe only one form of leaf-spring-securing assembly for vehicle axles embodying our invention, and will then point out the novel features thereof in claims.

Figure 1:
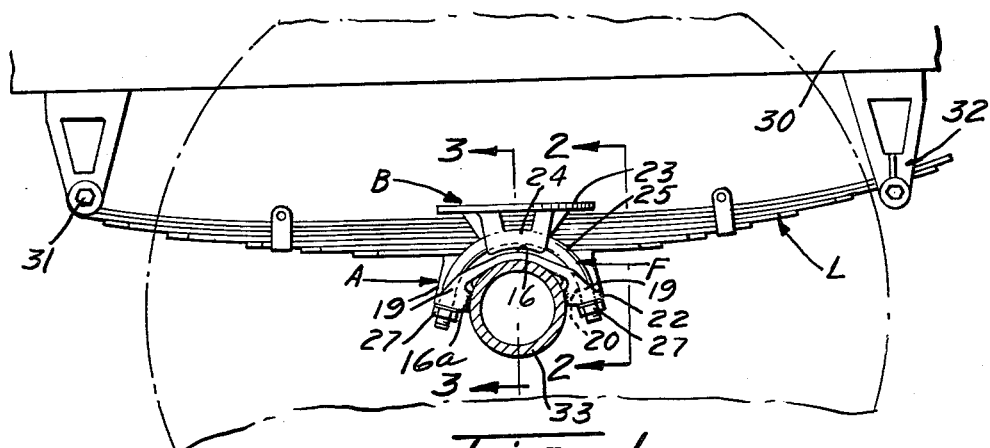
FIG. 1 is a view showing in side elevation one form of securing assembly embodying our invention applied to a vehicle leaf spring as mounted on the vehicle, and in securing position on a round axle.

Referring more particularly to the drawings, our invention in its present embodiment comprises, in the main, a seat member A, a saddle member B, and a pair of fastening members F for securing the saddle and seat members to each other, so as to clamp therebetween a vehicle leaf spring L, and to thereby provide, in conjunction with the spring, a unitary structure which, after proper adjustment of all of the members in relation to each other and to the spring, can be sold as a preadjusted unit or assembly for quick installation on a vehicle axle in the manner illustrated in FIG. 1 to hold the spring centered longitudinally on and at right angles to the axle, and without any further adjustment of any of the members.

The seat member A consists of a single casting constructed to provide a substantially flat top portion 15 of rectangular form, and at the longitudinal edges of such portion are arcuate side portions 16 connected adjacent their ends by transverse bracing members 17. Vertical bracing members 18 connect the top portion 15 with the members 17 between the ends of the latter. The portions 16 are flat transversely and curved longitudinally, and are formed with flanges 19 in pairs at the end portions thereof. Between the flanges of each portion 16 a groove 20 is formed, and on the inner side of such portion at the ends thereof a projection 16a is formed.

The saddle member B is likewise constructed as a single casting, and it comprises a top element 23 which may be of disk form in order to permit supporting thereon a circular air spring (not shown). This element 23 has a thickened central element 23a of rectangular form which extends diametrically across the center thereof. On opposite sides of the element 23a and secured to the element 23 are a pair of identical channel elements 24. Each of these elements 24 is of U-form in cross section, open at both ends, and the lower edge thereof is curved both longitudinally and transversely.

The spacing of the elements 24 from each other corresponds to the spacing of the portions 16 of the seat member A so that when the saddle member is applied to the seat member the channel elements will be disposed directly above the portions 16. Moreover, the spacing of the confronting sides of the channel elements 24 is slightly in excess of the spacing of the portions 16 so that the elements can move vertically in relation to the top portion 15.

Each fastening member F comprises a generally U-shaped bolt 25 which, as associated with the seat and saddle members, extends through one of the channel elements 24 so that its end portions repose in the grooves 20, and its free ends project from the lower and squared ends of the flanges 19. The bolt ends are screw-threaded as at 26 to receive nuts 27 with washers 28 interposed between the nuts and the projections 22.

As the spring L is applied to the seat and saddle members A and B, its longitudinal center portion extends between the elements 23a and the top portion 15, as well as between the channel members 24, so that such spring portion is seated on the portion 15. With the bolts 25 and nuts 27 applied to the members A and B, as previously described, the nuts are now adjusted upwardly on the bolts to draw the saddle member toward the seat member thereby causing the leaves of the spring to be clamped between the portion 15 and the element 23a, and with such security as to fix the spring leaves against relative lengthwise and crosswise shifting between the members.

Since the seat member, saddle member, bolts, and the spring are adapted to be preassembled at a factory, an assembly is thus formed that can be sold as such for application by the buyer to a round axle of particular diameter and without any adjustment of the parts of the assembly.

Figures 2, 3:
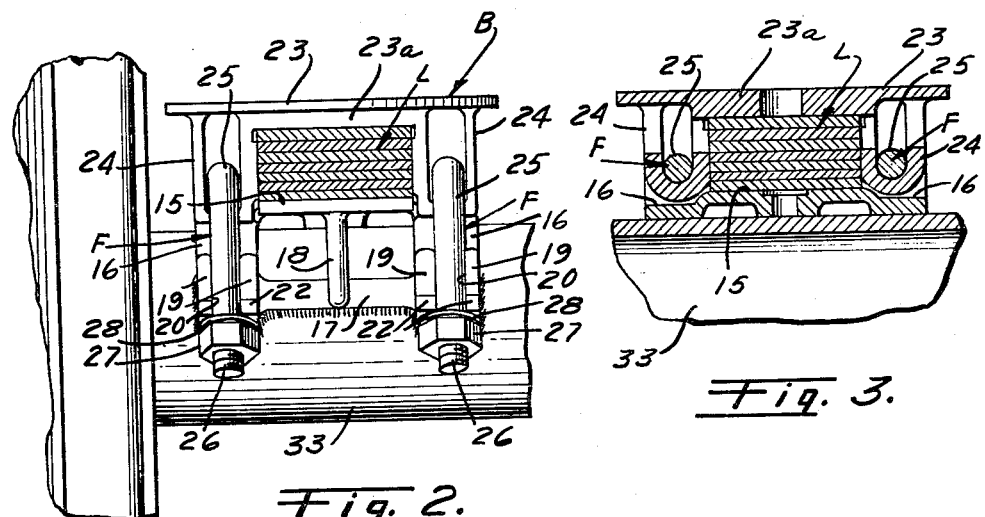
FIG. 2 is an enlarged vertical sectional view taken on the line 2—2 of FIG. 1.
FIG. 3 is an enlarged vertical sectional view taken on the line 3—3 of FIG. 1.
Figure 4:
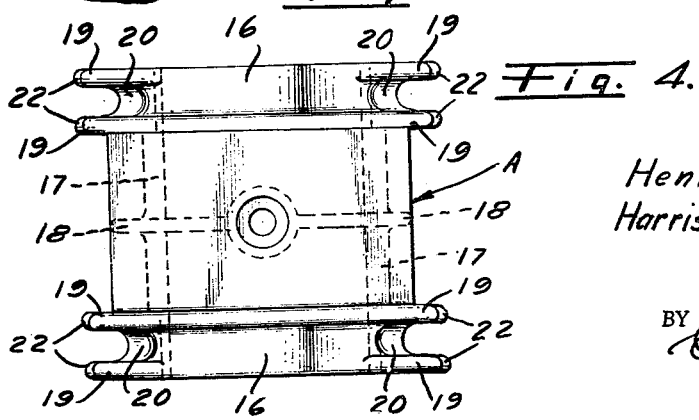
FIG. 4 is a detailed top plan view of the seat member of the assembly.

In FIG. 1 our invention is shown applied to a vehicle frame 30 provided with a forward hanger 31 in which the forward end of the spring L is pivoted, and a rear hanger 32 in which the rear end of the spring is slidably supported. The seat member A is fixed to the top half of the round vehicle axle 33 by welding the members 17, parts of the portion 16 and the projections 16a to the axle as illustrated in FIGS. 1 and 2. Since the saddle and seat members have already been adjusted and rigidly secured to the spring, the mere welding of the aforesaid parts of the seat member to the axle properly mounts the spring on the axle, and thus any adjustment of the assembly parts on the axle is eliminated.

While we have shown and described the invention as applied to a round vehicle axle by varying the contour of the lower side of the seat member A, the assembly can be mounted on vehicle axles of non-circular form in cross section such as square or rectangular axles.

Although we have herein shown and described only one form of leaf-spring-securing assembly for vehicle axles embodying our invention, it is to be understood that various changes and modifications may be made herein without departing from the spirit of our invention and the spirit and scope of the appended claims.

What we claim is:

1. A leaf-spring-securing assembly for a vehicle axle, including: a seat member having a flat top portion, and side portions adapted to be welded at their undersides to an axle for securing the seat member thereto so that said top portion is fixed horizontally at the top side of said axle; a saddle member of inverted U-form having a top element spaced from said top portion to receive a leaf spring therebetween, and side elements of channel form disposed directly above said side portions; curved bolts extending through the side elements and having their end portions seated on said side portions; said bolts being out of contact with the vehicle axle and disposed to one side thereof when said assembly is secured to an axle, and nuts adjustable on the ends of said bolts and engageable with the ends of said side portions for adjusting said bolts to pull the saddle member toward the seat member and thereby cause said spring to be clamped between said top portion and the top element.

2. A leaf-spring-securing assembly for a vehicle axle, the parts of which are capable of being preassembled and adjusted for securement to said axle as a unitary tightly clamped assembly, said assembly including a saddle member; a seat member having arcuate side portions; a leaf-spring between said members; arcuate bolts free of contact with said axle having their medial portions extending through the saddle member along the opposite lateral sides of said spring and their terminal portions seated in said side portions and projecting from the free ends thereof; and nuts adjustable on the free ends of said bolts to engage the free ends of said side portions for causing said bolts to clamp said spring between said members; said unitary assembly being securable to said axle by welding the lower side of the seat member to said axle.

3. In combination: a vehicle frame; a leaf spring mounted at its end on and depending from said frame; an axle; a seat member welded to the top side of said axle; arcuate flanges in pairs on opposite sides of the seat member; a saddle member of inverted U-form having its bight portion extending across the leaf spring directly above the seat member and its parallel portions extending downwardly at the sides of the leaf spring and seated on the seat member, said parallel portions being formed with grooves; arcuate bolts free of contact with said axle having their medial portions seated within said grooves and their terminal portions disposed between said flanges and projecting from the ends thereof; and nuts threaded on the projecting ends of said bolts for adjusting said bolts so as to secure the saddle member to the seat member and thus clamp the leaf spring between said members.

References Cited in the file of this patent

UNITED STATES PATENTS

| | | |
|---|---|---|
| 1,216,268 | Batenburg | Feb. 20, 1917 |
| 1,292,611 | Jones | Jan. 28, 1919 |
| 2,077,048 | Konetsky | Apr. 13, 1937 |
| 2,814,501 | Clark et al. | Nov. 26, 1957 |
| 2,874,956 | LaBelle | Feb. 24, 1959 |